(12) United States Patent
Shepard et al.

(10) Patent No.: US 7,163,706 B2
(45) Date of Patent: *Jan. 16, 2007

(54) VENTILATED CLOSURE STRIPS FOR USE IN PACKAGING FOOD PRODUCTS

(75) Inventors: William H. Shepard, Amherst, NH (US); Howard A. Kingsford, Northwood, NH (US)

(73) Assignee: Velcro Industries B.V., Curacao (AN)

( * ) Notice: Subject to any disclaimer, the term of this patent is extended or adjusted under 35 U.S.C. 154(b) by 525 days.

This patent is subject to a terminal disclaimer.

(21) Appl. No.: 10/688,720

(22) Filed: Oct. 15, 2003

(65) Prior Publication Data

US 2004/0131731 A1 Jul. 8, 2004

Related U.S. Application Data

(60) Continuation-in-part of application No. 09/718,002, filed on Nov. 21, 2000, now Pat. No. 6,656,403, which is a division of application No. 09/187,389, filed on Nov. 6, 1998, now Pat. No. 6,202,260, application No. 10/688,720, which is a continuation-in-part of application No. 10/357,608, filed on Feb. 4, 2003, now Pat. No. 6,991,375, which is a continuation-in-part of application No. PCT/US99/26261, filed on Nov. 5, 1999, which is a continuation-in-part of application No. 09/187,389, filed on Nov. 6, 1998, now Pat. No. 6,202,260.

(60) Provisional application No. 60/159,489, filed on Oct. 14, 1999, provisional application No. 60/228,819, filed on Apr. 16, 1999.

(51) Int. Cl.
 *B65D 33/00* (2006.01)
(52) U.S. Cl. .................. 426/118; 426/122; 426/123
(58) Field of Classification Search ................ None
See application file for complete search history.

(56) References Cited

U.S. PATENT DOCUMENTS

| | | | |
|---|---|---|---|
| 3,372,438 | A | 3/1968 | Rinecker |
| 3,387,345 | A | 6/1968 | Savoir |
| 3,417,440 | A | 12/1968 | Billarant |
| 3,464,094 | A | 9/1969 | Mates |
| 3,557,853 | A | 1/1971 | Jones |

(Continued)

FOREIGN PATENT DOCUMENTS

| | | |
|---|---|---|
| EP | 0 808 585 | 11/1997 |
| FR | 1 578 114 | 8/1969 |

OTHER PUBLICATIONS

Velcro Fastening Systems, "Sewing Guide" 1989.

*Primary Examiner*—Carolyn Paden
(74) *Attorney, Agent, or Firm*—Fish & Richardson P.C.

(57) ABSTRACT

A method of packaging a food product for retail sale includes forming a bag of sheet material and inserting a food product into the bag. The bag includes a ventilated, reclosable closure arranged to secure the bag against loss of bag contents that has first and second bands of fastener elements placed to form the ventilated, reclosable closure along an opening of the bag. The closure allows an amount of air into and out of the bag with the bag in a closed position after the bag has been opened at the opening to access the food product. The first band of fastener elements is an array of male fastener elements with stems extending from a base and heads arranged to engage a field of fibers.

21 Claims, 15 Drawing Sheets

U.S. PATENT DOCUMENTS

| | | |
|---|---|---|
| 3,594,865 A | 7/1971 | Erb |
| 3,696,472 A | 10/1972 | Perina et al. |
| 3,744,211 A | 7/1973 | Titchenal et al. |
| 3,807,626 A | 4/1974 | Goodrich |
| 4,567,987 A | 2/1986 | Lepisto et al. |
| 4,580,683 A | 4/1986 | Gouchenour |
| 4,592,118 A | 6/1986 | DeWoskin |
| 4,654,246 A | 3/1987 | Provost et al. |
| 4,672,722 A | 6/1987 | Malamen |
| 4,782,951 A | 11/1988 | Griesbach et al. |
| 4,794,028 A | 12/1988 | Fischer |
| 4,824,261 A | 4/1989 | Provost |
| 4,955,981 A | 9/1990 | Provost |
| 4,966,470 A | 10/1990 | Thompson et al. |
| 5,002,783 A * | 3/1991 | Ruiz ......................... 426/138 |
| 5,005,707 A | 4/1991 | Hustad et al. |
| 5,014,856 A | 5/1991 | Griesbach et al. |
| 5,026,563 A * | 6/1991 | Van Erden et al. ......... 426/122 |
| 5,032,122 A | 7/1991 | Noel et al. |
| 5,050,736 A * | 9/1991 | Griesbach et al. ........... 206/484 |
| 5,059,036 A * | 10/1991 | Richison et al. ........... 383/61.2 |
| 5,063,069 A * | 11/1991 | Van Erden et al. ......... 426/122 |
| 5,067,822 A | 11/1991 | Wirth et al. |
| 5,074,416 A | 12/1991 | Hustad |
| 5,077,064 A | 12/1991 | Hustad et al. |
| 5,088,164 A | 2/1992 | Wilson et al. |
| 5,129,734 A | 7/1992 | Van Erden |
| 5,172,980 A | 12/1992 | Provost |
| 5,215,380 A | 6/1993 | Custer et al. |
| RE34,347 E | 8/1993 | Van Erden et al. |
| 5,260,015 A | 11/1993 | Kennedy et al. |
| 5,315,740 A | 5/1994 | Provost |
| 5,369,847 A | 12/1994 | Naya et al. |
| 5,369,853 A | 12/1994 | Okawa et al. |
| 5,405,629 A * | 4/1995 | Marnocha et al. .......... 426/122 |
| 5,413,568 A | 5/1995 | Roach et al. |
| 5,456,928 A | 10/1995 | Hustad et al. |
| 5,461,845 A | 10/1995 | Yeager |
| 5,492,705 A | 2/1996 | Porchia et al. |
| 5,512,234 A | 4/1996 | Takizawa et al. |
| 5,515,583 A | 5/1996 | Higashinaka |
| 5,525,363 A | 6/1996 | Herber et al. |
| 5,582,853 A * | 12/1996 | Marnocha et al. .......... 426/122 |
| 5,601,368 A | 2/1997 | Bodolay et al. |
| 5,611,791 A | 3/1997 | Gorman et al. |
| 5,620,769 A | 4/1997 | Wessels et al. |
| 5,664,303 A | 9/1997 | Johnson |
| 5,669,120 A | 9/1997 | Wessels et al. |
| 5,699,593 A | 12/1997 | Jackson |
| 5,725,312 A | 3/1998 | May |
| 5,745,961 A | 5/1998 | Okawa et al. |
| 5,763,041 A | 6/1998 | Leak et al. |
| 5,773,120 A | 6/1998 | Deka et al. |
| 5,829,884 A | 11/1998 | Yeager |
| 5,857,245 A | 1/1999 | Sakakibara et al. |
| 5,873,456 A | 2/1999 | Hull et al. |
| 5,887,320 A | 3/1999 | Provost |
| 5,924,795 A * | 7/1999 | Thompson et al. ............ 383/5 |
| 5,985,407 A | 11/1999 | Murasaki |
| 6,010,244 A | 1/2000 | Dobreski et al. |
| 6,060,146 A | 5/2000 | Akeno et al. |
| 6,202,260 B1 | 3/2001 | Clune et al. |
| 6,637,939 B1 * | 10/2003 | Huffer ........................ 383/64 |

\* cited by examiner

VENTILATED CLOSURE STRIPS FOR USE IN PACKAGING FOOD PRODUCTS

CROSS-REFERENCE TO RELATED APPLICATIONS

This application is a continuation-in-part of U.S. application Ser. No. 09/718,002, filed Nov. 21, 2000 now U.S. Pat. No. 6,656,403, which is a divisional of U.S. application Ser. No. 09/187,389, filed Nov. 6, 1998, now U.S. Pat. No. 6,202,260. This application is also a continuation-in-part of U.S. application Ser. No. 10/357,608, filed Feb. 4, 2003 now U.S. Pat. No. 6,991,375, which is a continuation-in-part of PCT Patent Application Ser. No. PCT/US99/26261, filed Nov. 5, 1999, revived by petition filed on Apr. 9, 2003, which is a continuation-in-part of U.S. application Ser. No. 09/187,389, filed Nov. 6, 1998, now U.S. Pat. No. 6,202, 260. PCT Patent Application Ser. No. PCT/US99/26261 claims the benefit of U.S. Provisional Patent Application Ser. No. 60/159,489, filed Oct. 14, 1999 and also claims the benefit of U.S. Provisional Patent Application Ser. No. 60/228,819, filed Apr. 16, 1999, which was converted to a Provisional Patent Application from a Utility application Ser. No. 09/293,257.

TECHNICAL FIELD

This invention relates to closure strips, and more particularly to vented closure strips for storing food products.

BACKGROUND

Packaging is often used in storing food products. Such packaging often employ some type of seal for isolating the food product from the surrounding environment after the food product is placed within the package. In some instances, the seal is non-reclosable. In other instances, a repeated use seal may be employed. One type of repeated use seal is the rib-and-groove type of closure such as is marketed under the name ZIPLOCK®.

SUMMARY

Aspects of the invention provide a package having a ventilated, reclosable closure that is useful in storing a food product.

One aspect of the invention features a method of packaging a food product for retail sale that includes forming a bag of sheet material and inserting a food product into the bag. The bag has a ventilated, reclosable closure arranged to secure the bag against loss of bag contents. The closure has first and second bands of fastener elements placed to form the ventilated, reclosable closure along an opening of the bag that allows an amount of air into the bag with the bag in a closed position after the bag has been opened at the opening to access the food product. The first band of fastener elements are an array male fastener elements with stems extending from a base and heads arranged to engage a field of fibers forming the second band of fastener elements.

In some embodiments, the method includes attaching a tamper-evident seal extending across the opening. The seal is formed so that it is blemished upon opening the bag. In some cases, the method includes permanently affixing a closure strip to two sidewalls of a bag body along the opening to form an airtight seal. The closure strip has a sheet-form substrate with the array of male fastener elements extending therefrom and a band of loops formed by the fibers carried on the substrate arranged to engage the male fastener elements. The substrate defines a frangible region extending along the closure strip between the bands of loop and male fastener elements for tearing the substrate between the bands of loop and male fastener elements to form the ventilated, reclosable closure and to break the airtight seal.

Where an air-tight seal is employed, the method can include transporting the food product with the food product within the bag and isolated from the environment by the air-tight seal; breaking the air-tight seal and forming separate fastener element and loop closure strips; opening the reclosable bag to gain access to the food product positioned within the bag; and engaging the fastener element closure strip and the loop closure strip, the fastener element and loop closure strips forming the ventilated, reclosable closure between the food product and the environment with the fastener elements and loops engaged.

In certain embodiments, the male fastener elements have stem portions that are integrally molded with the base. The heads of the fastener elements can extend laterally from the stems in multiple directions forming mushroom-shaped heads or the fastener element heads can extend laterally from the stems in one or more discrete directions.

In some cases, the method includes providing a continuous length of sheet material and directing the continuous length of sheet material over a forming head. The closure strip is attached to the sheet material along its continuous length. In some cases, one bag length of the sheet material is severed prior to inserting the food product to form the bag having the closure along the opening. In other cases, one bag length of the sheet material is severed subsequent to inserting the food product to form the bag having the closure along the opening.

In some embodiments, the sheet material is a food-contact grade material. The food product can be produce or granular material.

In another aspect, the invention features a pre-packaged food product that includes a quantity of food product contained within a bag. The bag includes a bag body having two opposing sidewalls joined along three edges to form therebetween a pouch having an open end and first and second fastening regions. The first fastening region has a base and an array of fastener elements having stems that extend from the base. The first fastening region is permanently attached to one of the two opposing sidewalls. The second fastening region has a base and an array of fastener-engageable loops extending from the base. The second fastening region is permanently attached to the other of the two opposing sidewalls. The first and second regions are placed to form a releasable closure along an opening of the bag for securing the opening in a closed position after the bag has been opened to access the food product. The first and second regions allow an amount of air into and out of the pouch after the bag has been opened and reclosed.

In some embodiments, a closure strip carries the first and second fastening regions and is permanently attached to the two sidewalls of the bag body forming an airtight seal prior to opening the bag. The closure strip includes a sheet-form resin substrate forming the base. The substrate has at least one frangible region extending longitudinally along the length of the closure strip between the first and second regions for tearing the substrate between the loops and the fastener elements to form separate fastener element and loop closure strips and to break the airtight seal.

In some cases, the fastener element stems are integrally molded with the base. Heads of the fastener elements can be mushroom-shaped heads that extend laterally from the stems in multiple directions or heads can extend laterally from the stems in one or more discrete directions.

As a repeated use closure, the product of the invention provides a ventilated, easily alignable closure. As the bands of loops and fastener elements are relatively wide, there is no need for accurate alignment to form a reliable closure. The closure is able to accommodate a fair amount of dirt or debris without losing its function as a closure, making it particularly applicable as a closure for bags containing granular or powder substances. In addition, the porosity of the closure can provide some degree of filtering of airborne dust. Such a ventilated closure can be particularly desirable in cargo containers of airplanes in order to accommodate pressure changes, and, by its venting action, may help to avoid moisture buildup and any resulting condensation, e.g., to keep produce and other such items fresh.

Ventilated closure strips can also be advantageous in the storage of vegetables and fruits. The ventilated closure can allow release of gases produced by vegetables and fruits, e.g., during respiration, that can be deleterious to the taste, smell and/or texture of the food product stored within the bag. The closure can also facilitate transfer of heat, e.g., liberated by a vegetable or fruit, out of the bag to minimize excessive heat build up, which in turn can increase deterioration of the food product. Further, by limiting the rate at which air enters and exits the bag body, moisture transmission from the bag body can be relatively controlled. In some cases, such as with a fruit or vegetable, it may be advantageous to limit water loss, which can, in turn, lead to deterioration. In certain cases, such as with grains or bread, it may be advantageous to facilitate moisture transmission, which can reduce, e.g., mold growth.

In certain embodiments where a tear strip is molded into the center of the closure strip, the closure strip can advantageously maintain an airtight seal until the bag is initially opened. This can be particularly useful during transportation and/or storage of a food product. The continuous closure strip provided by the invention is readily adaptable to standard bag-making equipment and, in many instances, is directly weldable to compatible bag materials. These advantages accrue to bags produced according to the invention and having such a repeated use closure.

If made of an appropriate width, the closure strip of the invention can be folded and sealed to itself to form an enclosed bag.

By employing a very light, non-woven loop material and integrally molded fastener elements in several instances, the resulting product is relatively inexpensive and flexible.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
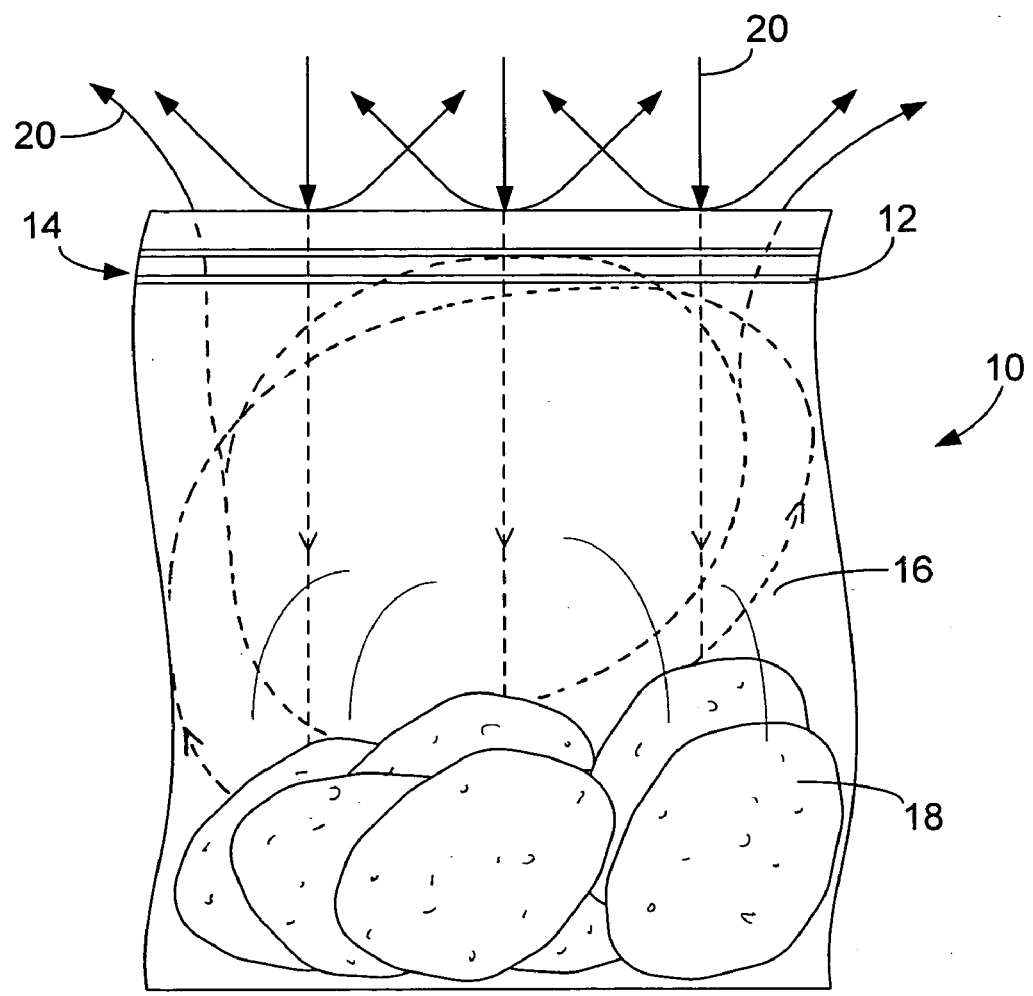
FIG. 1 is a front view of a vented bag with a reclosable closure strip.

Referring to FIG. 1, a reclosable bag 10 consists of parallel closure strips 12 and 14 that are permanently attached to opposing faces of a bag body 16. Positioned within bag body 16 is a food product 18 (e.g., bread, granular items such as flour, sugar, produce including vegetables such as beet, radish, potato, turnip, yam, onion, sprouts, asparagus, cabbage, celery, rhubarb, collards, cabbage, kale, leek, lettuce, mustard greens, spinach, watercress, artichoke, broccoli, cauliflower, lily bud, squash, cucumber, eggplant, beans, peas, zucchini, corn, mushrooms, fruits (or seeds) such as nuts, apple, coconut, avocado, blueberry, cherry, cranberry, date, grape, jackfruit, mango, olive, papaya, peach, pear, pineapple, strawberry, tomato). Closure strips 12 and 14, when engaged, form a vent between the food product and the environment allowing passage of and amount of air 20 into and out of bag body 16.

Figure 2:
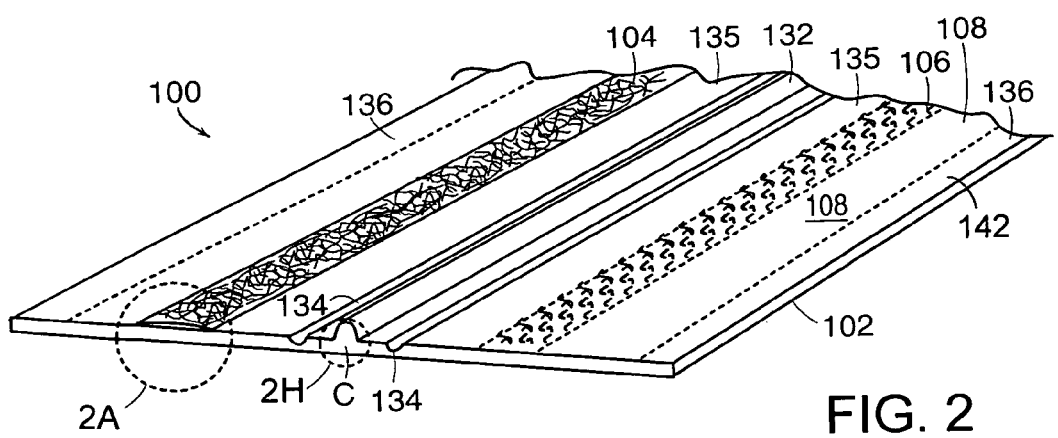
FIG. 2 is a perspective view of a composite touch fastener in the form of a closure strip.

As will be described in greater detail below, closure strips 12 and 14 are preferably hook and loop closure strips where loops of the loop closure strip are capable of engaging hooks of the hook closure strip, such as that described in U.S. Pat. No. 6,202,260, the entire contents of which are hereby incorporated by reference. Referring to FIG. 2, a lengthwise-continuous closure strip 100, such as for closing a bag, consists of a thin, sheet-form resin substrate 102 with lengthwise-continuous, parallel bands 104 and 106 of loops and fastener elements, respectively, on its front face 108. Bands 104 and 106 are equally spaced from the center "C" of the closure strip, such that when the strip is folded longitudinally at "C" to cover front face 108, the fastener elements of band 106 engage and retain the loops of band 104 to form a releasable fastening. The fastener elements 110 of band 106 are integrally molded with and extend from front face 108. In this embodiment, these fastener elements are in the form of J-hooks that extend, in rows, along the length of the closure strip. Some of the J-hooks face in opposite directions along the strip. Other fastener element shapes may also be employed, including those that overhang the substrate 102 in a widthwise direction. A suitable fastener element shape is the CFM29 hook shape (of about 0.015 inch in height), available in various products sold by Velcro USA in Manchester, N.H.

Band 104 of loops consists of a preformed, non-woven web of polymer fibers, which may include a stabilizing binder, and which are bonded to front face 108 of substrate 102 at various points across the width and length of the web. Suitable loop materials include those disclosed in U.S. Pat. No. 6,342,285, the entire disclosure of which is hereby incorporated by reference as if fully set forth.

Preferably, the non-woven loop material in band 104 is very thin, such as less than about 0.040 inch thick (more preferably, less than about 0.020 inch thick), with web fibers held in a transversely stretched condition and free-standing loop structures extending from its exposed surface. As discussed in the above-referenced patent application, the loop structures extend from associated knots in the stretched web, which may be stabilized by liquid binder wicked into the knots and cured. Between knots, the thin fiber mat is not very dense and is sheer enough to permit images to be readily seen through it. Overall, the loop material has a basis weight (in its preformed state, including any pre-applied binder) of less than about 4 ounces per square yard (136 grams per square meter), preferably less than about 2 ounces per square yard (68 grams per square meter). Other details of this loop material may be found in the above-referenced application. For applications in which the loop material is partially penetrated by resin of the substrate as the substrate is formed (as discussed below), the needled loop material is preferably only stretched in a transverse direction only about 22 percent to leave a fair amount of loft and avoid total penetration.

In some instances, loop material 104 is partially encapsulated directly in resin of the substrate as the substrate is formed in a continuous molding process (described below). In other cases, it is bonded to the formed substrate, either by ultrasonic bonding, welding, or adhesives.

Figure 2A:
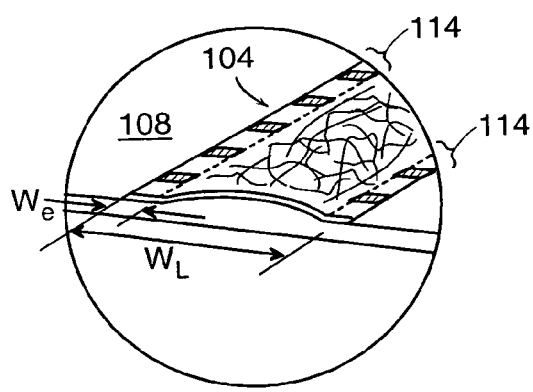
FIGS. 2A and 2H are enlarged views of areas 2A and 2H, respectively, in FIG. 2.

FIGS. 2A through 2D illustrate various patterns of variable bonding between loop material 104 and substrate 102. Such variable bonding patterns correspond, in some cases, to variable resin penetration into the web of the loop material, which may be achieved by employing different arrangements of staking rings and/or barrier materials between the loop material and substrate, both of which are discussed further below. In FIG. 2A, loop material 104 is only fully penetrated by substrate resin in narrow edge regions 114, and is less penetrated at its center. For instance, if loop material is about ¾ inch wide ($W_L$), then fully penetrated edge regions 114 may have a width of only about ⅛ inch ($w_e$). The center region of the loop material is less penetrated and gently arches away from the substrate, presenting the loops for engagement. The inclined sides of the center arch can also help to enhance the peel strength of the fastening at the edges of the loop material, as they resolve a small component of the peel force in a tangential, or shear, direction.

Figure 2B:
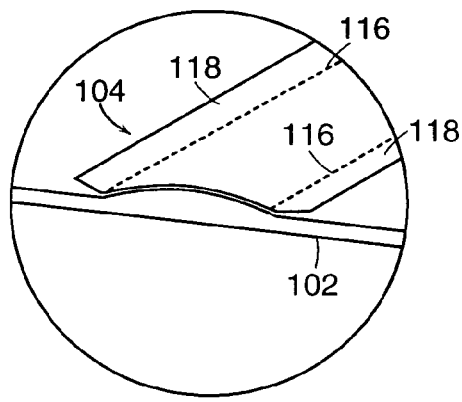
FIGS. 2B through 2G illustrate the structure of area 2A in various other closure strip embodiments.
Figure 3A:
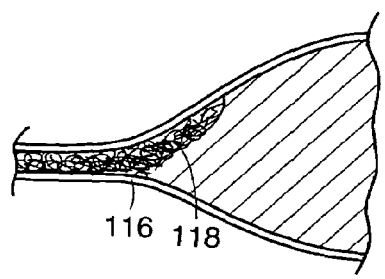
FIG. 3A illustrates the application of fill-shifting loads in a bag having the closure strip of FIGS. 2 and 2B.
Figure 3B:
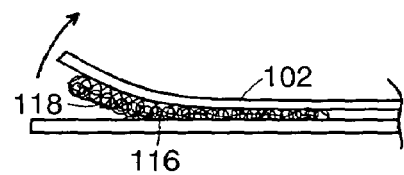
FIG. 3B illustrates the application of peel force to the closure strip of FIGS. 2 and 2B.

In FIG. 2B, the loop material is fully bonded to the substrate in narrow bands 116 spaced inward from its edges in an anti-peel configuration, leaving edge regions 118 relatively lightly bonded, or even loose. One advantage of this bonding pattern is that the inner edge region 118 on the inside of the associated bag helps to deflect separation loads caused by shifting bag contents, which would otherwise generate high peel forces between the fastener elements and the loops, into separation forces between the loop material and substrate (as illustrated in FIG. 3A). The high bonding strength of inner band 118 helps to avoid delamination of the loop material from the substrate. Another advantage of this bonding pattern is that it enhances initial peel strength of the fastening, as the outer edge region 118 of the loop material follows the fastener elements during peel until it is separated in shear (FIG. 3B).

Figure 2C:
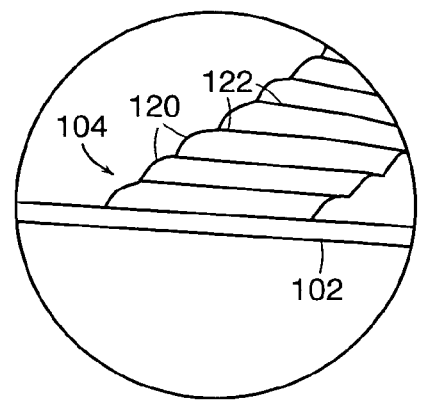

The pattern of variable bonding shown in FIG. 2C creates transverse pillows 120 of relatively lightly bonded, or loose, loop material separated by transverse bands 122 of relatively more fully bonded (e.g., more deeply encapsulated) loop material. The loftiness of pillows 120 is exaggerated for illustration. Referring to FIG. 2C, this pattern provides some of the peel-enhancing and load-shifting advantages of the pattern of FIG. 2B, due to the "free" pillow ends along the inner and outer edges of the loop material.

Figure 2D:
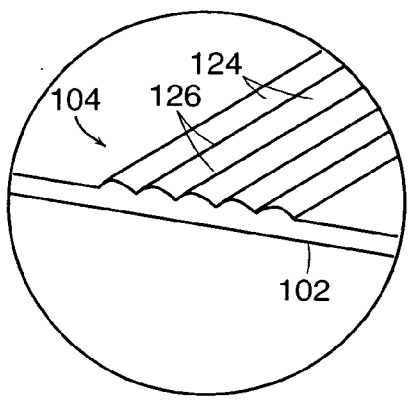
Figure 2E:
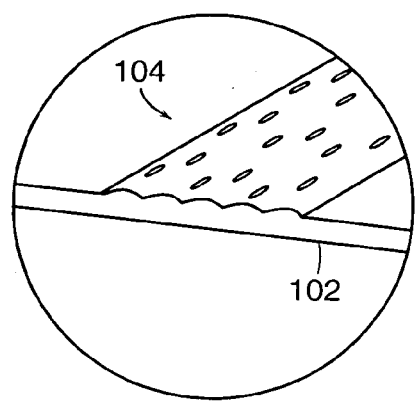
Figure 2F:
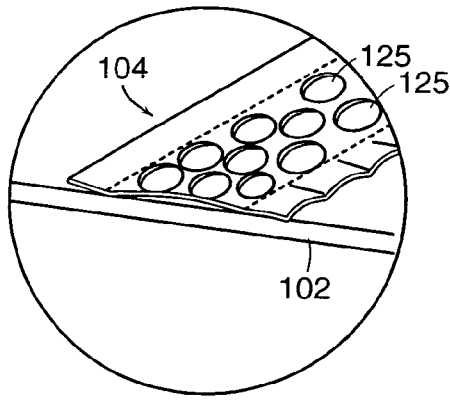
Figure 2G:
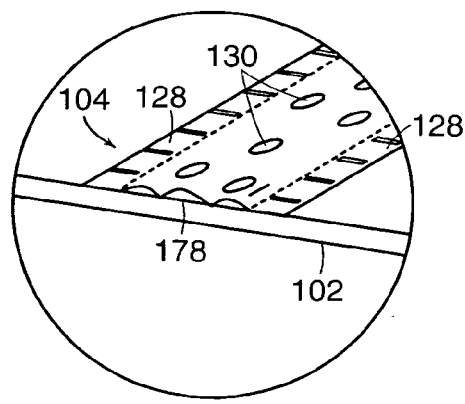

FIG. 2D illustrates a bonding pattern with longitudinal pillows 124 of relatively lightly bonded, or loose, loop material, separated by longitudinal bands 126 of relatively more fully bonded (e.g., more deeply encapsulated) loop material. Again, the loftiness of the pillows is exaggerated for illustration. FIG. 2E is a variation of the pattern of FIG. 2D, with each longitudinal band of more fully bonded material separated into longitudinally alternating regions of light and heavy bonding. The regions of light and heavy bonding are staggered across the loop material, producing a checkerboard pattern of lofted loop pillows. In the pattern illustrated in FIG. 2F, the center region of loop material 104 is heavily bonded to the substrate about the peripheries of spaced apart, circular lofted regions 125 which are less firmly bonded. The exposed surfaces of the lofted loop pillows 125 extend outward to present loops for engagement. Other shapes of lofted regions 125, such as ovals, may also be employed. One of the edge regions of the loop material of FIG. 2F is similar to the edge regions shown in FIG. 2B, while the other forms transverse pillows similar to those of FIG. 2C. FIG. 2G shows a bonding pattern with edge regions 128 of alternating light and heavy bonding, and a center region bonded in only isolated regions 130.

Generally, bonding patterns (such as those described above or any combination or variation thereof) may be chosen as desired. It should be noted, however, that the pattern chosen can affect the peel loads and/or load-shifting advantages realized by the closure. For example, where greater initial peel strength and/or load-shifting is desired, it may be advantageous to employ a longitudinal bonding pattern, such as that shown by FIG. 2B. In other cases, where lesser initial peel strength and/or load shifting advantages is desired, it may be advantageous to employ a transverse bonding pattern, such as that shown by FIG. 2C. Other patterns may be chosen to increase or decrease peel strength and load-shifting.

Orientation of the loops with respect to the fastener elements can also increase or decrease the peel strength of the closure. For example, in some embodiments, the loops of a loop material, such as a knit or a woven, are oriented such that their openings are presented, at least to some degree, to engaging heads of the fastener elements to increase the peel load the closure can withstand. Alternatively, loops can be oriented such that their openings are somewhat closed or skewed with respect to the loop engaging heads to decrease the peel load the closure can withstand. Combinations of opening and skewing the loops with respect to the loop engaging heads can also be employed.

Figure 2H:
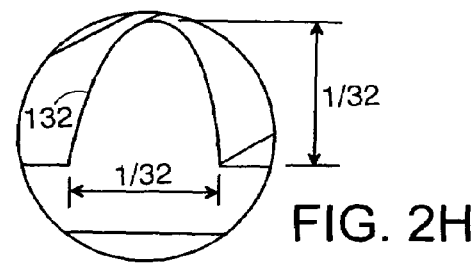

Referring back to FIG. 2, molded into the front face 108 of substrate 102 along its center is a hump-shaped longitudinal rib 132 between a pair of grooves 134 molded into front face 108. As shown in FIG. 2H, one example of this rib 132 has a height of about 1/32 inch and a width of about 1/32 inch at its base. The rib may have a hump-shaped profile, as shown, or a rectangular cross-section with parallel sides. The rib is preferably longitudinally continuous, as shown, but may alternatively be formed as a row of appropriately shaped protrusions.

Figure 4:
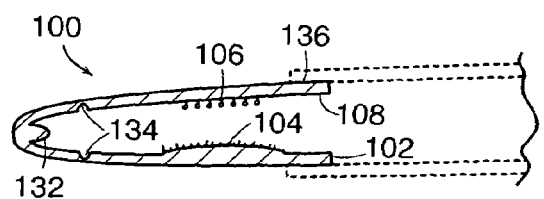
FIG. 4 is a cross-sectional view of the closure strip, folded and installed at the opening of a bag in a sealed condition.

The formed closure strip 100 is permanently installed at the openable end of a bag by attaching edge regions 136 of the closure strip to outer edges of the bag at its opening, with the loop and hook bands facing each other, as shown in FIG. 4. The bag may be attached to the back face of the closure strip as shown, in which case edge regions 136 are defined on the back face of the closure strip, or on the front face, with the edges of the bag on the inside. Methods of attaching the closure strip to the bag include, but are not limited to, welding, gluing, adhering or stitching. One preferable method of attaching a closure strip to a bag of a compatible resin is by directly welding the resin of the closure substrate to the resin of the bag, as discussed below. In this manner, polyethylene closure strips may be readily welded to polyethylene bags.

Figure 5A:
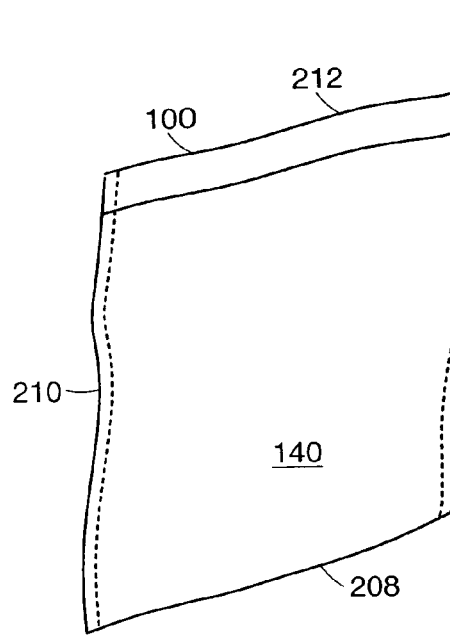
FIGS. 5A and 5B illustrate a bag with the closure strip of FIG. 2, in sealed and opened conditions, respectively.
Figure 5B:
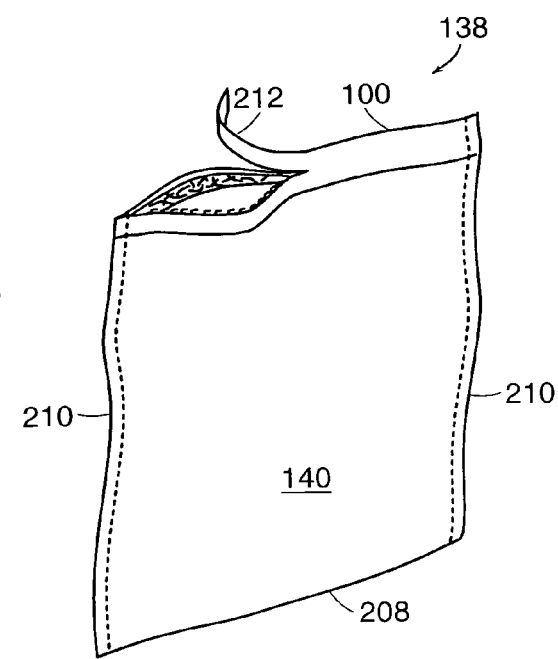
Figure 6:
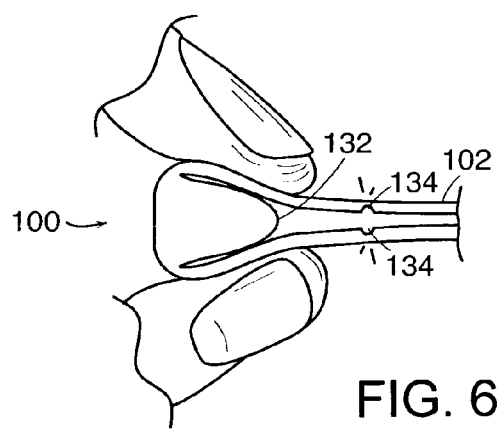
FIG. 6 is an enlarged cross-sectional view of the outer edge of the closure strip being grasped to open the bag.

FIG. 5A illustrates a sealed bag 138 having a polyethylene body 140 welded to closure strip 100 across its openable end forming an air-tight seal. Preferably, the thickness of the substrate of the closure strip is about the same as the thickness of the material of the bag body, in the range of about 0.001 to about 0.005 inch. Substrates of up to at least 0.015 inch in thickness, however, may be produced by the methods described below. To initially break the seal and open the bag, the outer fold of closure strip 100 is grasped and pulled, thereby tearing the folded edge from the bag from one end of the bag to the other, as shown in FIG. 5B. In grasping the outer fold of the closure strip, the middle rib 132 is grasped between the thumb and forefinger. Rib 132 thus provides an edge of increased thickness for easy grasping. As the folded edge of the closure strip is torn away, the closure strip tears along grooves 134. Grooves 134 function as frangible tear points for initially opening the associated bag, and may be straddled by an associated local thickening of the substrate, such as in the form of rows of raised bumps (not shown) to direct the propagation of the tear along the grooves.

Closure strip 100, prior to breaking the airtight seal, forms a "shelf seal" that isolates the contents of the bag from the environment. A shelf seal may be desirable where the condition of the bag contents may be adversely affected by exposure to the environment (e.g., during transport, storage, shelving for retail sale). Upon breaking the shelf seal, the contents of the bag can be accessed through the openable end of the bag (e.g., by a consumer). The bag can then be reclosed using the fastener element bands positioned near the openable end of the bag forming a ventilated "pantry seal" that can be reopened and reclosed as desired.

Figure 7:
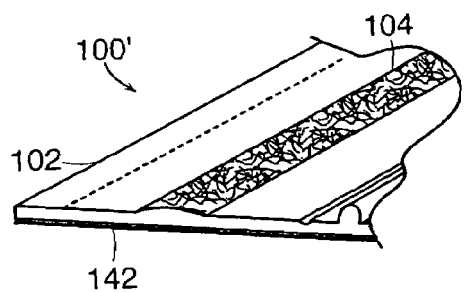
FIG. 7 is a perspective view of a closure strip having a paper backing.

Preferably, the bag is formed of a food-contact grade material and/or the resin of the substrate of the closure strip is compatible with the resin of the bag body, to enable direct welding of the two together. In situations where direct welding is not practical, a separate layer of a bag-compatible material may be provided on the closure strip. For example, a layer of paper 142 may be bonded to either the front face of the closure strip (e.g., in edge regions 136 in FIG. 2), or across the back face of the closure strip as shown in FIG. 7, or along just the edges of the back face of the closure strip (not shown). The paper 142 may be directly bonded to the resin of the substrate (e.g., during the forming of the substrate, as described below), or joined with adhesive after the substrate is formed. In some cases, composites of multiple layers of differing materials (e.g., of differing polyethylene blends) are used where one layer is compatible with the material of the bag body and another layer is compatible with material of the closure strip.

Figure 8:
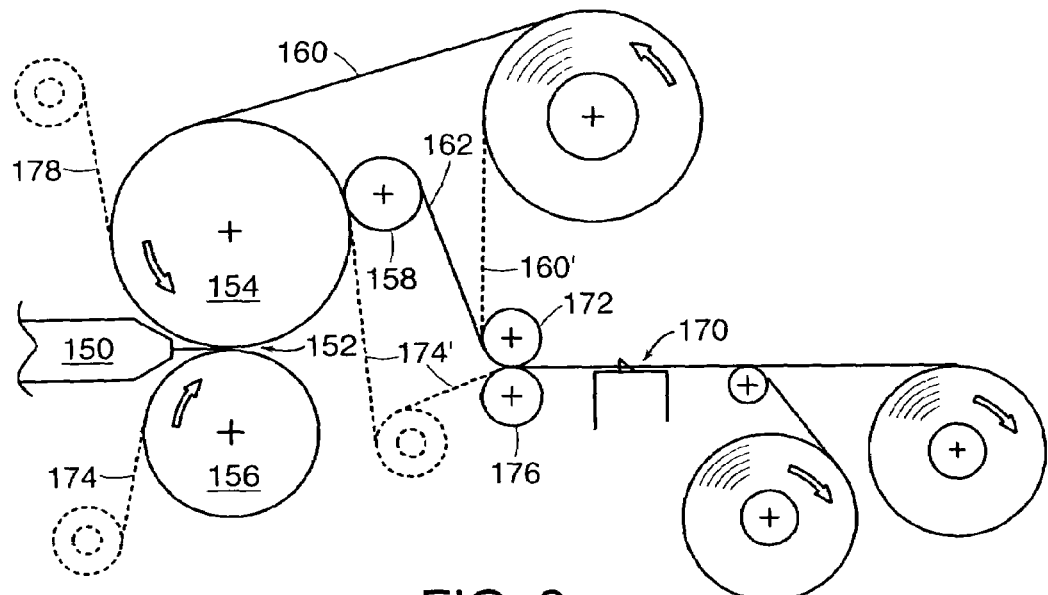
FIG. 8 illustrates a first method and apparatus for forming composite touch fastener tapes, such as the closure strips of FIGS. 2 and 7.

FIG. 8 illustrates one method and apparatus for producing the above-described closure strips. The method builds upon the continuous extrusion/roll-forming method for molding fastener elements on an integral, sheet-form base described by Fischer in U.S. Pat. No. 4,794,028, and the nip lamination process described by Kennedy, et al. in U.S. Pat. No. 5,260,015, the details of both of which are incorporated herein by reference. The relative position and size of the rolls and other components is not to scale. An extrusion head 150 supplies a continuous sheet of molten resin to a nip 152 between a rotating mold roll 154 and a counter-rotating pressure roll 156. Mold roll 154 contains an array of miniature, fastener element-shaped mold cavities extending inward from its periphery (not shown) for molding the fastener elements. Pressure in nip 152 forces resin into the fastener element cavities and forms the substrate. The formed product is cooled on the mold roll until the solidified fastener elements (e.g., hooks) are stripped from their fixed cavities by a stripper roll 158. Along with the molten resin, a continuous strip of loop material 160 (which becomes loop band 104 in FIG. 2) is fed into nip 152, where it is partially impregnated by resin and becomes permanently bonded to the front face of the substrate. Thus the product 162 which is stripped from the mold roll includes both fastener elements and loops.

Figure 9:
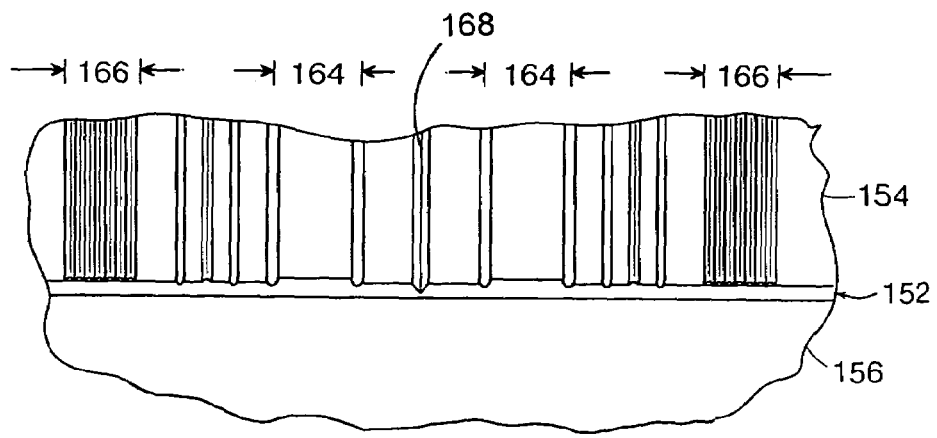
FIG. 9 is an enlarged, unscaled view of the forming nip of the apparatus of FIG. 8.

For higher production rates, two or more widths of closure strip may be simultaneously produced on a single mold roll, and later split and spooled. Referring also to FIG. 9, two strips 160 of loop product are fed in parallel into positions 164 along nip 152. Molten resin is introduced across the entire nip, forming two bands of hooks in regions 166. Mold roll plates of appropriate widths and edge configurations are arranged to produce the ribs and grooves at the center of each closure strip. A splitting channel ring 168 at the center of the mold roll produces a splitting channel in the product, along which the resulting tape is split by a blade 170 (FIG. 8; either stationary or rotating) into two separate runs of closure strip which are separately spooled.

FIG. 8 also indicates several variations of the above-described method. For instance, rather than introduce the loop material 160 through nip 152 and thereby join it to the substrate as the substrate is molded, the loop material may be joined to the substrate after the substrate has been formed, such as is indicated by the run 160' of loop material shown in dashed outline. In this case, front face idler 172 is heated and has a contoured surface for producing the desired pattern of bonding between the loop material and the substrate. Paper may be joined to the back face of the substrate, to produce the product shown in FIG. 7 by either running a strip 174 of paper through nip 152 on the pressure roll side of the resin, or by adhering adhesive-coated paper 174' to the formed substrate either at stripping roll 158 or at idler 176. In some cases, adhesive-coated paper 174' includes a transfer coating, such that its paper backing may be peeled from the adhesive on the back of the product to secure the back of the final product to a supporting surface. The adhesive applied to the back of the product in this manner may be either a pressure-sensitive or heat-activated adhesive, for instance. For decreasing the permeability of the final product, a second flow of resin (either molten or in the form of a film) may be added to the nip against pressure roll 156, as strip 174 is shown, to form a backing on the final product. For instance, a layer of polyester may be added to reduce the permeability of a polyethylene closure strip, such as for packaging certain foods. The pattern of penetration of resin into the loop material in nip 152 is optionally controlled by adding a strip of barrier material 178 between the loop material and the molten resin. Barrier material 178 may be, for instance, a perforated paper or film that allows resin to pass into the loop material in selected regions but inhibits its flow into other regions, such as for producing the bonding pattern of the center region of loop material shown in FIG. 2G The barrier material may also be a homogeneous sheet of material having a high porosity, equally limiting the penetration of resin into the loop material across the width of the barrier material. Rather than be introduced as a separate sheet, the barrier material may be pre-applied to the surface of loop material 160 and may be in the form of a binder located in discrete areas of the loop material and locally encapsulating fibers of the loop material, for instance. In many cases, the barrier material will be narrower than the loop material, and centered along the width of the loop material, to enable full penetration of resin into the edges of the loop material. In some cases, however, as to produce the bonding pattern of FIG. 2B, for instance, thin strips of barrier material may be run into the nip along the edges of the loop material to inhibit the bonding of edge regions 118 (FIG. 2B) to the substrate. Other arrangements of barrier and loop materials, and resulting bonding patterns, will be apparent upon reading this disclosure. In all cases, the barrier material should be selected for its low material cost and weight, as it will most likely be permanently bonded to the substrate and become an integral part of the final product.

Figure 10:
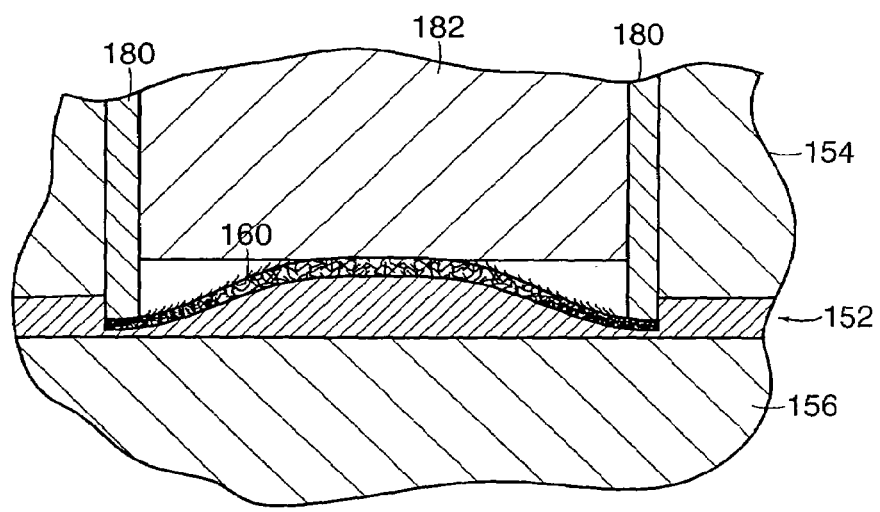
FIG. 10 is a highly enlarged view of the loop material securing region of the nip of FIG. 9.

FIG. 10 illustrates the bonding of the loop material 160 to the resin of the substrate in area 164 of nip 152 (FIG. 9). "Staking" rings 180 on either side of a reduced diameter plate 182 engage the edges of the loop material to locally hold the edges of the loop material against the resin of the substrate as the resin forms the substrate under nip pressure, thereby ensuring heavy penetration of the loop material in predetermined areas along its edges. This configuration shown in FIG. 10 produces the bonding pattern illustrated in FIG. 2A, the staking rings 180 forming heavily bonded edge regions 114, the width $w_e$ corresponding to the width of the staking ring. The staking rings may extend slightly beyond the nominal mold roll diameter, as shown in FIG. 10, or be flush with adjoining mold roll rings (as shown in FIG. 10A, for example).

Figure 11:
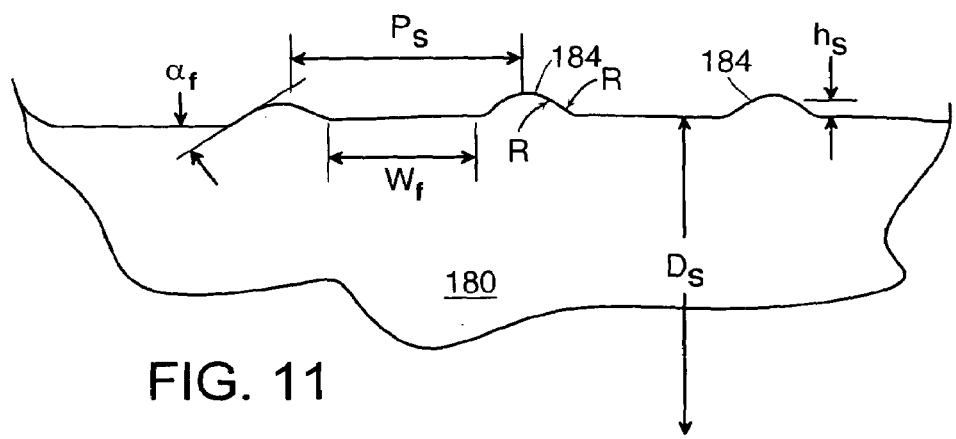
FIG. 11 is an enlarged view of a portion of the outer edge of a staking ring.

To form a row of heavily bonded points separated by regions of lower resin penetration, some staking rings 180 have a contoured outer edge as shown in FIG. 11. A series of protrusions 184 extending beyond the nominal diameter $D_s$ of the staking ring cause the resin to locally penetrate farther into the loop material. In this example configuration, $D_s$ is 9.968 inches, the height ($h_s$) of each protrusion 184 is 0.014 inch, and the inner and outer radii (R) at the flank of each protrusion is 0.015 inch. The protrusion pitch ($P_s$) is 0.190 inch, and the length of the flat between protrusions ($w_f$) is 0.130 inch. The dimensions of the protrusions are selected to attempt to optimize the maximum approach angle $\alpha_f$ of the protrusion flank with respect to a local ring tangent. A steep approach angle (i.e., an abrupt change in ring diameter) can cause a sharp local increase in nip pressure and an undesirable local flooding of the front side of the loop material with resin. Such flooded areas can create local "depth stops" to mating fastener elements, reducing the fastener element penetration into the loop material. A zero approach angle (i.e., no protrusions) would result in a homogeneous resin penetration beneath the staking ring, which may not be as desirable as local loop material "pillowing" (discussed above) in some applications. The maximum approach angle $\alpha_f$ in the illustrated staking ring embodiment is about 40 degrees. A shallower angle (e.g., of about 30 degrees) may be preferable in some cases, as may a longer spacing $w_f$ between protrusions to provide longer, lofted pillow regions.

Figure 10A:
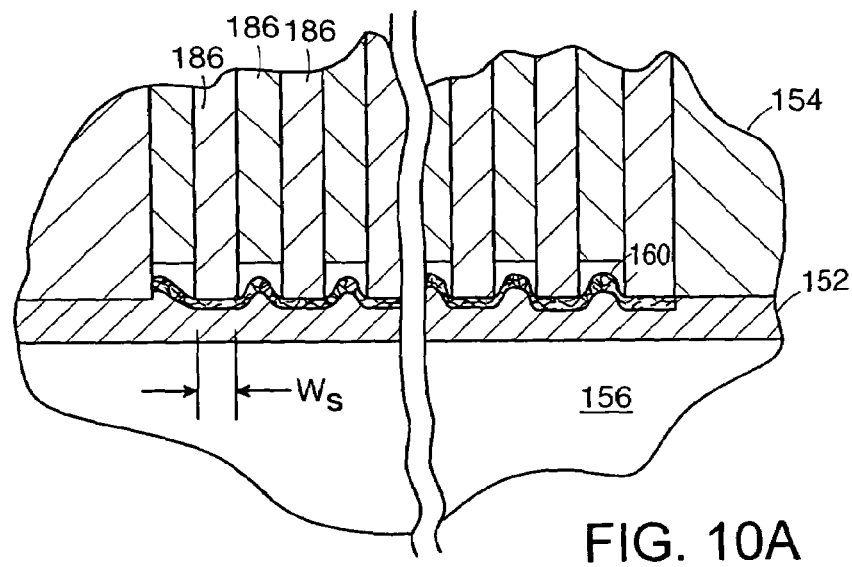
FIG. 10A illustrates an alternative arrangement of the loop material staking region.

FIG. 10A shows a staking ring configuration for producing the bonding pattern shown in FIG. 2E. Staking rings 186 having the profile shown in FIG. 11 are stacked together with staggered protrusions, such that the pattern of heavily bonded regions resembles a checkerboard with elongated "pillows" extending outward between the heavily bonded regions. The width $w_s$ of each ring is about 0.018 inch.

Figure 14:
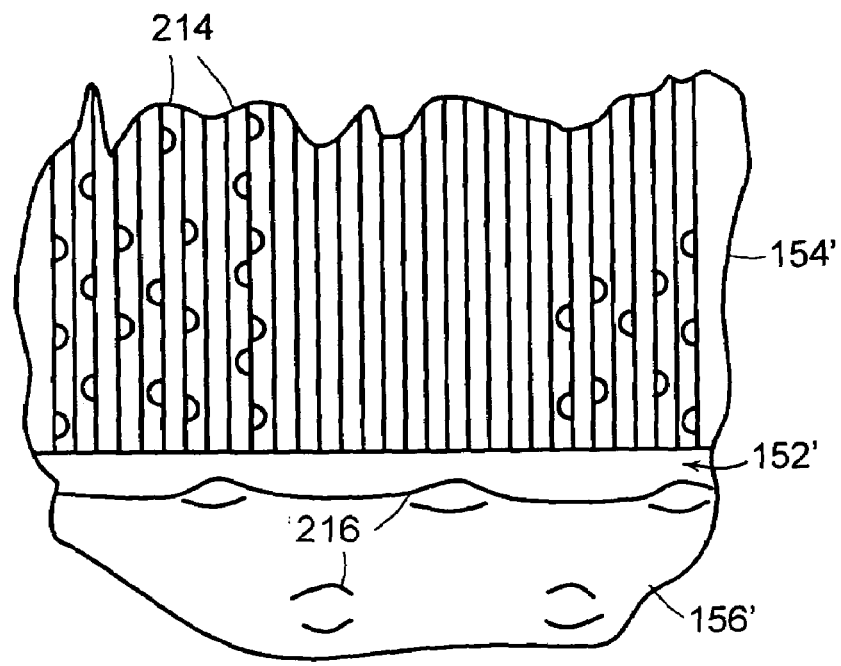
FIG. 14 shows a nip formed between a mold roll and a contoured pressure roll.

This in situ staking method for attaching loop material to the resin of a fastener substrate as the substrate is being formed has broad applicability to the production of composite touch fasteners. For example, FIG. 14 shows a nip 152' between a mold roll 154' and a pressure roll 156'. Mold roll 154' contains many thin fastener element molding rings 214, which may be alternated with spacer rings (not shown), to integrally mold fastener elements extending from one side of a sheet-form base as taught by Fischer. In this case, however, pressure roll 156' has a pattern of protrusions 216 extending from its otherwise smooth surface. The protrusions locally narrow gap 152' in discrete regions, causing a variation in nip pressure during formation of the fastener tape. Running a fibrous preformed material through the nip against the pressure roll with the molten resin, as taught by Kennedy, et al., will, in this configuration, cause fibers of the preformed material to be encapsulated more fully in the resin in areas corresponding to protrusions 216. This in situ "staking" method is particularly useful when the fibrous preformed material is a very porous, thin material such as a needled non-woven web with a low basis weight. The pattern of protrusions on the pressure roll is selected to form an inverse pattern of lofted "pillows" of loop material at most only partially encapsulated in the substrate resin.

Figure 15:
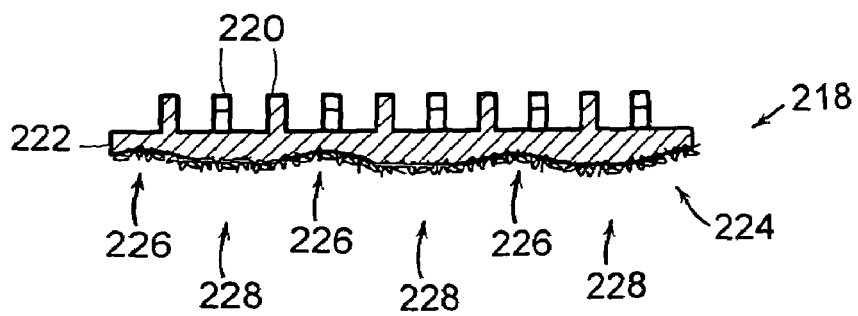
FIG. 15 is a transverse cross-section of a composite fastener tape formed in the nip of FIG. 14.

FIG. 15 is a transverse cross-section of a composite fastener tape 218 produced in this fashion, having an array of hook-shaped fastener elements 220 extending from one side of the substrate 222, and a lightweight, non-woven web of loop material 224 permanently bonded to an opposite side of the substrate. Loop material 224 is coextensive with the substrate in this case (i.e., it extends across the full width of the substrate), but is fully encapsulated in substrate resin only in discrete regions 226. Between regions 226, the loop material forms the above-described "pillows" 228, or lofted regions, which are not fully encapsulated in resin. The loft of pillows 228 enables the heads of fastener elements 220 to penetrate the loop material and engage individual fibers during fastening. A similarly contoured pressure roll 156' (FIG. 14) may also be employed to attach a strip of loop material to the fastener element side of a fastener tape.

Figure 12:
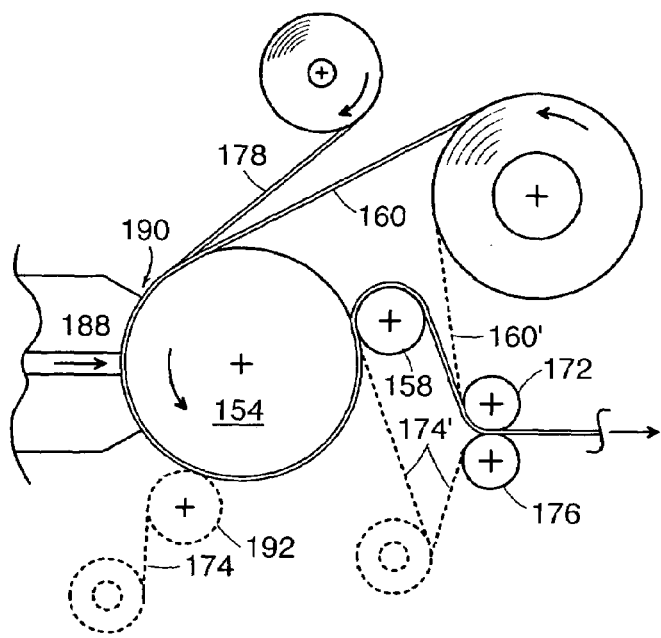
FIG. 12 illustrates a second method and apparatus for forming composite touch fastener tapes, such as the closure strips of FIGS. 2 and 7.

FIG. 12 illustrates an alternative method and apparatus for forming the above-described closure strips. The contoured surface of an extrusion head 188 (sometimes called an injection head) is placed adjacent a mold roll 154 (with fixed fastener element molding cavities as described above with respect to FIG. 8), and a continuous flow of molten resin is injected under pressure into the gap 190 defined between head 188 and mold roll 154, filling the fastener element cavities and forming the front and back faces of the substrate. The configuration and construction of mold roll 154 is the same as is shown in FIG. 9, in which member 156 may be taken to be the adjoining extrusion head. The strip 160 of loop material is fed through a predetermined region of gap 190, and held up against the surface of mold roll 154 by resin pressure in the gap. In this manner, the loop material is partially impregnated with substrate resin and permanently bonded to the front face of the substrate. In applications where it is not possible to fill the fastener element cavities without completely saturating the loop surface of the loop material with resin, a strip of barrier material 178 may be fed through gap 190 between head 188 and loop material 160. Barrier material 178 is discussed in more detail above with respect to FIG. 8. A strip 174 of paper or other suitable backing material may be laminated to the back face of the substrate while the molded product is retained on roll, by pressure supplied by a pressure roll 192, as shown in dashed outline. Alternatively, a strip of adhesive-coated paper 174' may be adhered to the formed substrate either at stripping roll 158 or at idler 176.

Figure 13:
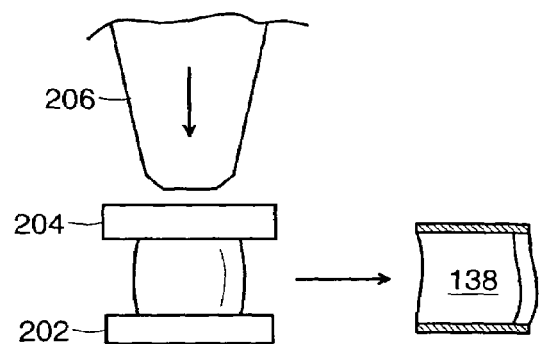
FIG. 13 illustrates a method and apparatus for forming bags.
Figure 13:
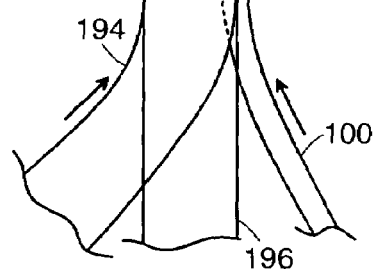

FIG. 13 illustrates a method and apparatus for forming and filling bags (such as bag 138 of FIG. 4A). Closure strip 100 and a sheet of bag material 194 are each folded and fed about a longitudinal mandrel 196, with their edges overlapping at two points. In the embodiment shown, both the bag material 194 and the substrate of closure strip 100 are polyethylene. Two heated rollers 198 (only one visible from the perspective illustrated) weld the edges of the closure strip and bag material together to form a continuous tube 200 with two longitudinal sealed seams. In the apparatus shown, tube 200 extends upward through a lower sealing/cutting device 202 and an upper sealing device 204. In the bag forming and filling sequence, tube 200 is advanced upward until its open end is aligned with upper sealing device 204. Lower sealing/cutting device 202 then forms a transverse seal across the tube to form one sealed side of the resulting bag. The bag is then filled (e.g., with a food product) from above, through the still open end of the tube, with material supplied through chute 206. After a predetermined amount of material has been released into the bag, the open end of the tube is sealed by upper sealing device 204 to form a sealed bag 138, which is then severed from tube 200 by cutting the tube just below the previously formed transverse seal by lower sealing/cutting device 202. The resulting bag 138 has one edge 208 of folded bag material 194, two sealed edges 210, and one edge 212 of folded closure strip 100. Other standard sequences of forming and filling bags from tubes of preform material are known to those of normal skill in the art of bag-making. For instance, for sealing the paper-covered surface of closure strip 100' (FIG. 7) to a paper bag material 194, a layer of adhesive would normally be applied between the overlapping paper edges of the closure strip and bag material.

Figures 16, 16A:
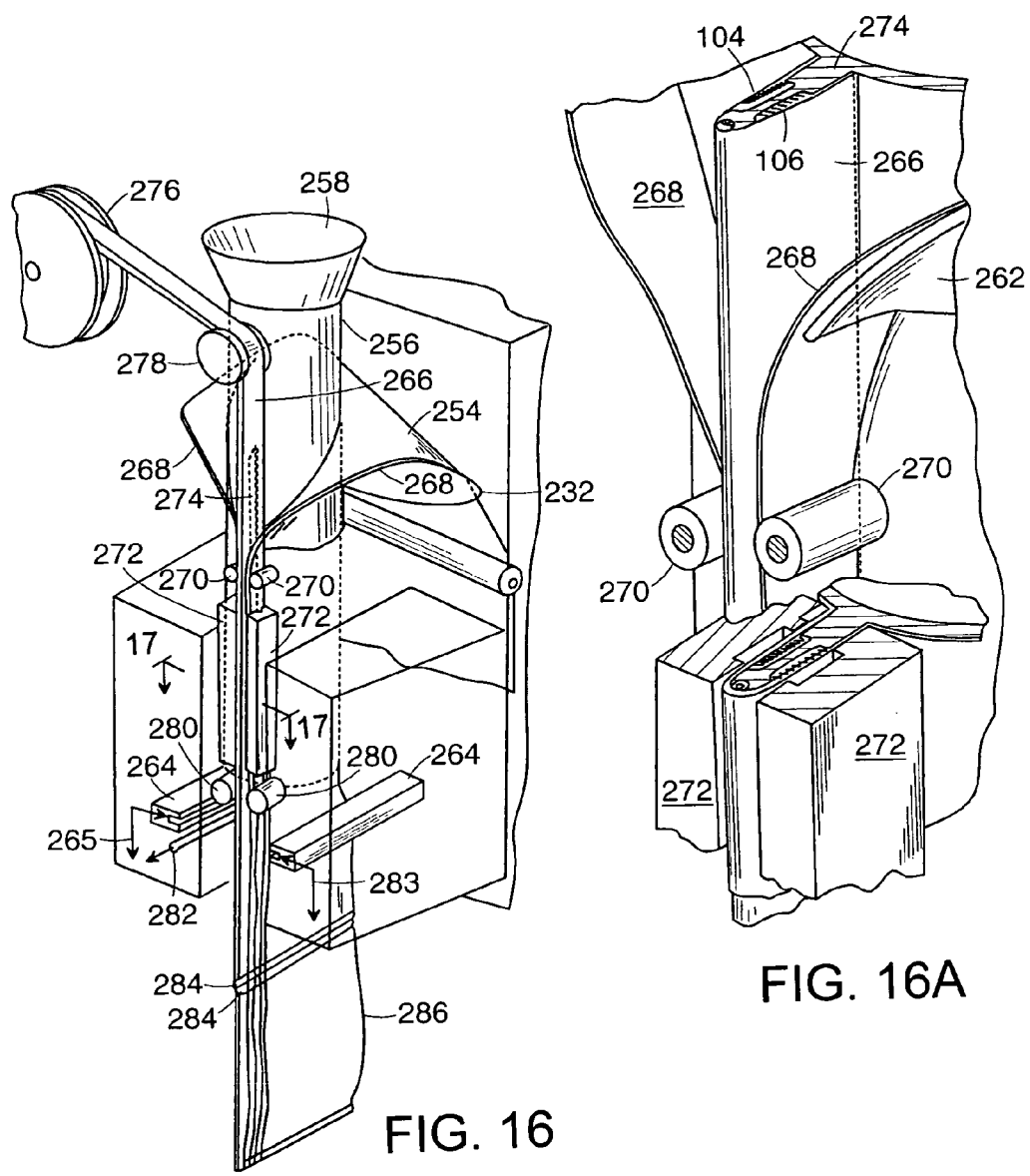
FIG. 16 illustrates a second vertical form/fill bagging apparatus, configured to accommodate the closure strip of the invention.
FIG. 16A is an enlarged view of the means for joining the closure strip to the bag web in FIG. 16, with portions removed to show the configuration of the insulator rail and sealing jaws.

FIG. 16 illustrates a modification to a more common VFF machine configuration, for continuously securing the above-described closure strip to a flow of bag-forming web during the forming and filling of individual bags. The bag-forming web consists of a thin sheet of thermoplastic film 254 which is shaped into a tube by being fed over a filling tube 256, which has an upper funnel end 258 through which contents are discharged to fall into individual bags formed of the film. Film 254 is fed from a roll (not shown) over an attitude roller 260, and guided onto the fill tube by curved guide forms 262. In some cases, the film is advanced continuously and the transverse sealing jaws 264 (described below) reciprocate vertically, traveling with the film during the sealing/cutting process (as indicated by arrows 265); in other cases the film is advanced incrementally and the transverse jaws remain within the same horizontal plane.

Figure 17:
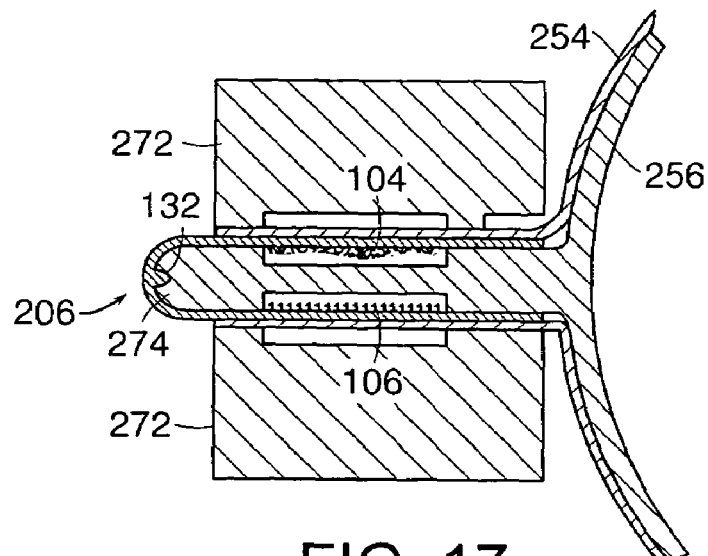
FIG. 17 is a cross-sectional view, taken along line 17—17 in FIG. 16.

As film 254 is formed into a tube, its two longitudinal edges 268 form flanges extending generally radially from the tube, between which a continuous length of closure strip 266 is fed in a folded condition, such that the edge regions of the web film lie at least partially against the outer sides of the closure strip in face-to-face relation, but do not overlap the folded edge of the closure strip. Guide rollers 270 above the closure sealing bars 272 maintain the adjacency of the sides of the closure strip and the film edges. Closure strip 266 is fed over a contoured insulating rail 274 extending longitudinally along the fill tube from above guide rollers 270 to below closure sealing bars 272. As shown in FIGS. 16A and 17, insulating rail 274 has a longitudinal groove along each of its sides. One groove accommodates the loop material 104 so as to avoid crushing the extended engageable loops, and the other groove receives the hooks 106 of the closure strip, helping to guide the closure strip through the sealing process. Rail 274 also has a notch extending along its distal end, for accommodating the middle grasp rib 132 of the closure strip. The primary purpose of insulating rail 274 is to inhibit undesired welding of the inner sides of the closure strip together as the edges of the bag film are welded to the outer surfaces of the closure strip by closure sealing bars 272 (see FIG. 17). When not employing an insulating rail, the closure strip may be configured to utilize the insulating properties of the loop material to avoid permanent welding together of the inner surfaces of the closure strip, as discussed more fully below.

Closure strip 266 may either be spooled from roll 276 over guide roll 278 in a folded condition, as shown, with its hooks and loops engaged and then pulled over insulating rail 274, thus separating the hook and loop sections of the closure strip, or the closure strip may be spooled flat and then folded about the insulating rail, thereby avoiding having to disengage the hook and loop sections in the process.

Closure sealing jaws 272 each have a longitudinal groove adjacent the longitudinal grooves of insulating rail 274, such that the heated sealing jaws slidingly contact the film edge regions only on either side of the hook and loop bands of the closure strip, sealing the film to the closure strip in two discrete bands on each side of the closure strip. Sealing jaws 272 have appropriate heating elements embedded within them (not shown) to maintain the sealing surfaces at a predetermined, elevated temperature. To leave the inner edge of the loop side of the closure strip free from the film to form an anti-peel flap (as discussed above with respect to FIGS. 2A and 2B), the sealing jaw 272 on the loop side of the closure is at least partially recessed, as shown, to avoid bonding the inner edge of the loop side of the closure strip to the bag film. To form an even wider anti-peel flap, the sealing jaw 272 on the loop side of the closure may be configured to contact the bag film only outboard of the band of loop material 104.

Immediately below the lower edges of sealing jaws 272, insulating rail 274 terminates and the hook and loop bands of the closure strip are pressed together between a pair of rollers 280, just above the lower end of fill tube 256.

After a selected amount of contents have discharged through the lower end of the fill tube, transverse sealing jaws 264 come together about the bag film and closure strip and form two parallel, transverse seals 284, each of which will form the sealed edge of a bag. As jaws 264 travel with the advancing film, a cutting knife 282 within the jaws severs the film and closure strip between the transverse seals 284. When jaws 264 open at the end of the sealing cycle, a fully formed, filled and severed bag 286 is complete.

Figure 17A:
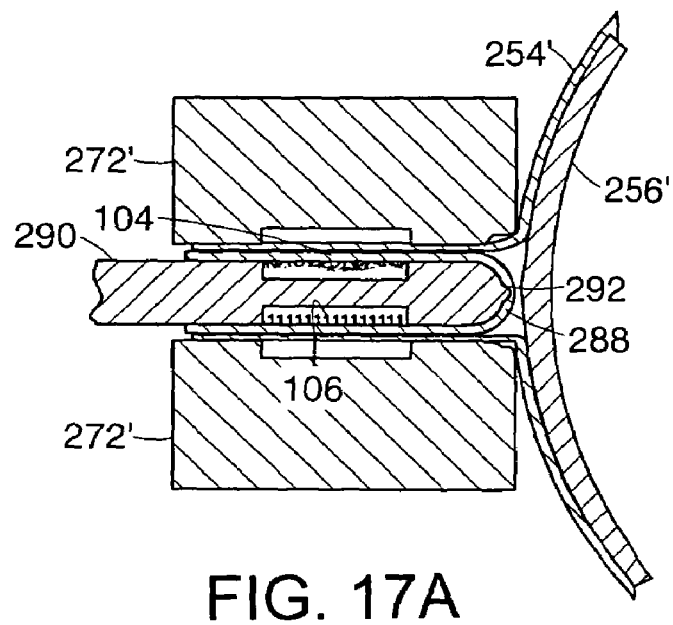
FIG. 17A is a cross-sectional view, corresponding to FIG. 17, with an inverted closure strip arrangement.

FIG. 17A shows another configuration of sealing a closure strip 288 to edge regions of a film web 254 as the film web is fed about a fill tube 256, for creating what we call an inverted closure having free outer edges and a recessed center portion. In this configuration the closure strip is guided over a separate insulating rail 290 that extends between the film edges and the opposing sides of the closure strip, similar in cross-section to the insulating rail of FIG. 17 but in opposite orientation. In this case closure strip 288 is provided with a center tear notch 292, rather than a center rib, along which the closure is burst to initially open the bag. In the bag formed with this style closure, the hook and loop elements are not exposed to the bag contents prior to the initial opening, and the center portion of the closure strip provides a tamper-evident seal. Closure strip 288 is permanently sealed to the bag film by heated sealing jaws 272' which are similar in construction to sealing jaws 272 of FIG. 17.

Figure 18:
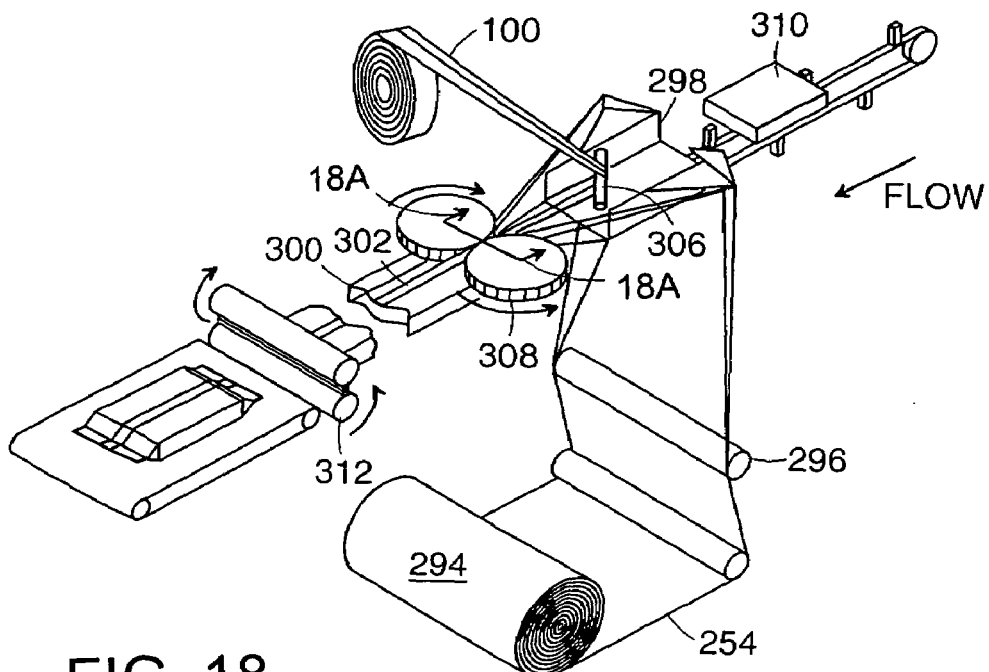
FIG. 18 shows a first inverted horizontal form/fill packaging apparatus and method, with the closure strip fed into the fin seal between the web flanges.
Figure 19:
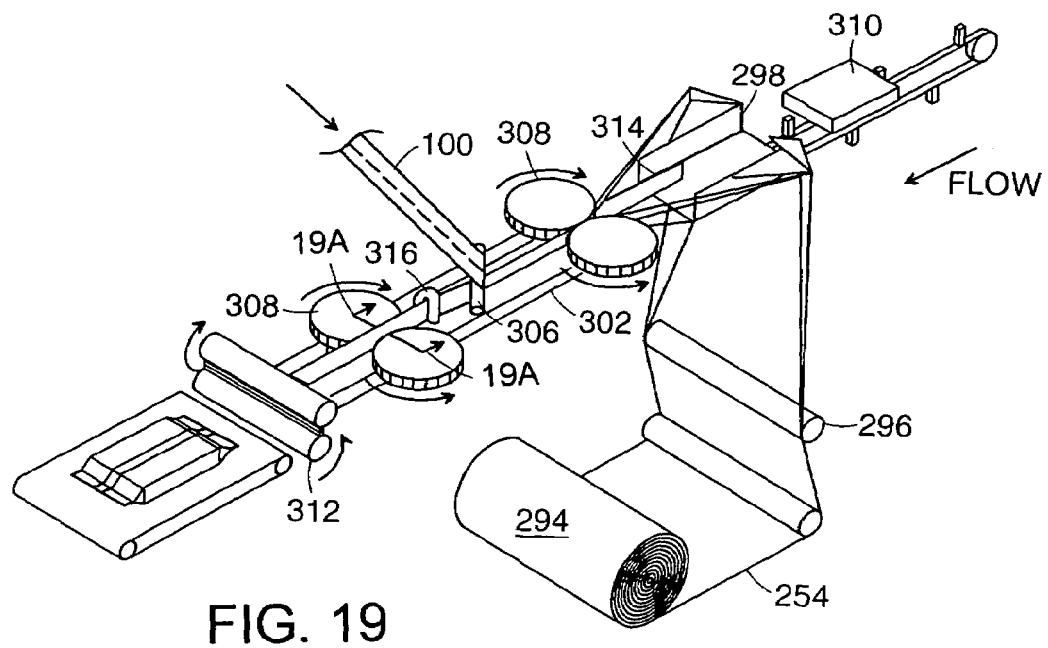
FIG. 19 shows a second inverted horizontal form/fill packaging configuration, with the closure strip wrapped about the web flanges.
Figure 20:
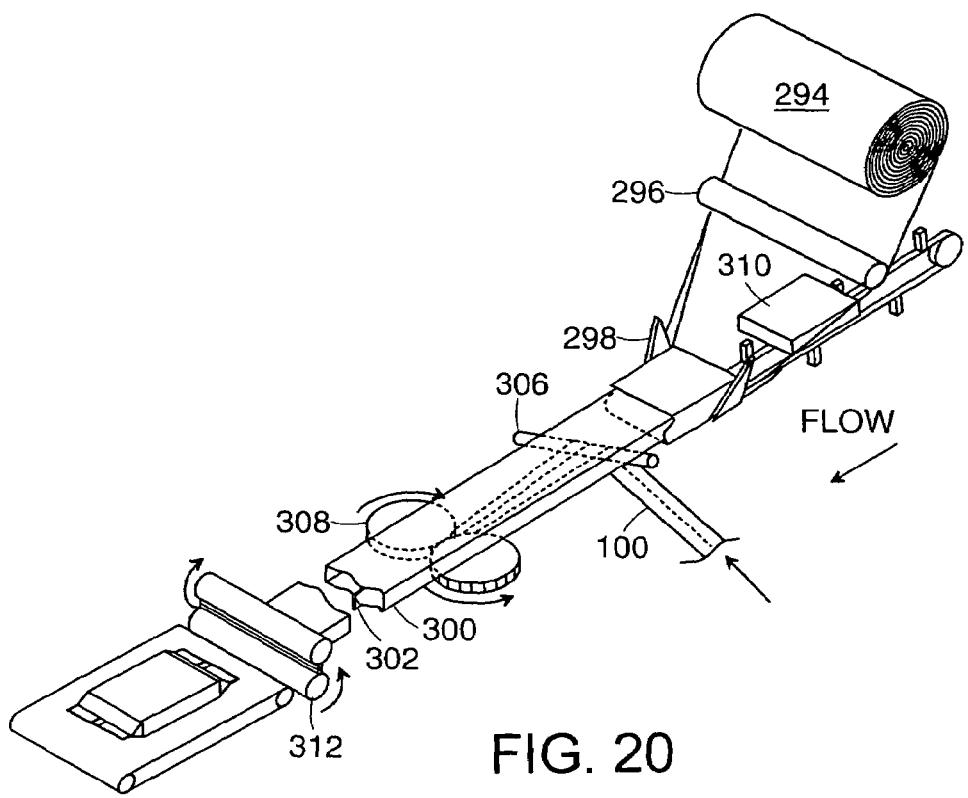
FIG. 20 shows a third horizontal form/fill packaging method, with the fin seal formed on the underside of the packages.

FIGS. 18–20 illustrate three examples of horizontal form/fill (HFF) machines and processes featuring the above-described closure strips. Referring first to FIG. 18, a bag film 254 is continuously fed from roll 294 over attitude roller 296 and into a forming head 298 shaped to form the film into a rectangular tube 300. As with the VFF method described above, the edges of the film are brought together to form a perpendicular fin 302 extending from one side of the tube. In this case, closure strip 100 is fed from roll 304, folded to engage the hook and loop bands, passed about angled roller 306, and fed into the nip between heated fin seal rollers 308 between the edges of the bag film. Meanwhile individual products 310 to be packaged (e.g., trays of cookies) are fed through the forming head and into film tube 300 at a predetermined spacing and rate corresponding to the speed of the bag film.

Figure 18A:
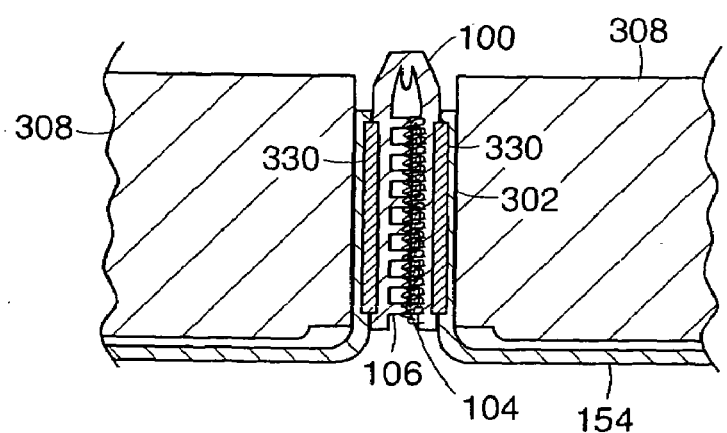
FIG. 18A is a cross-sectional view, taken along line 18A—18A of FIG. 18.

As shown in FIG. 18A, the outer surfaces of folded closure strip 100 are permanently welded to the extending film flanges forming the perpendicular fin 302 of the film tube in the nip between fin seal rollers 308. No insulating rail is needed between the inner surfaces of the closure strip in this case because the air between the hooks and loops extending from the inner surfaces of the closure strip pre-vents extensive welding inside the closure strip. With proper adjustment of the temperature and pressure of rollers 308, which depends on the type of resin employed and the line speed, among other things, at most only a small fraction of the heads of hook elements in hook band 106 will be lightly bonded to either loop material 104 or the resin in which the loop material is embedded. This small amount of bonding will advantageously increase the amount of peel force required to initially open the package, leaving a sufficient proportion of undamaged hook elements to provide adequate engagement upon reclosure. We note that with many hook and loop resins, speeds, temperatures and pressures will have to be carefully adjusted and controlled to provide a light bond while avoiding rapid progression of hook melting.

Referring back to FIG. 18, diagonal offset folding rollers (not shown) fold over the fin seal, and a pair of offset rollers 312 carrying a heated seal bar and cutting blade seal the ends of the bags and sever the bags from each other.

Figure 19A:
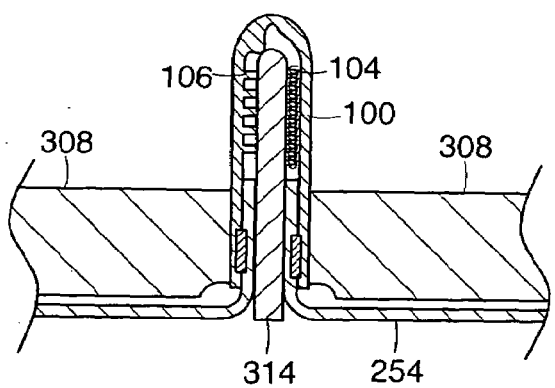
FIG. 19A is a cross-sectional view, taken along line 19A—19A of FIG. 19.

FIG. 19 shows a similar HFF process, in which the closure strip 100 is folded over on the outside of both the bag film flanges and a fin seal insulating rail 314 that extends to just downstream of heated fin sealing rollers 308. Passed around angled roller 306, closure strip 100 is folded within a guide channel 316 such that the edges of the closure strip overlap the edges of the bag film, as shown in FIG. 19A. These overlapped regions are welded together on either side of insulating rail 314 by the fin sealing rollers, permanently bonding the closure strip to the bag film. As the fin seal is folded over before passing between offset rollers 312, the hook and loop bands of the closure strip are pressed together, before the inner surfaces of the bag film flanges are welded together at the end seals of the bag. The hook and loop bands may also be welded together at the end seals, if desired, by providing sufficient heat, pressure and dwell time of the portion of the heated sealing bar of the offset rollers that contacts the closure strip at the hook/loop interface.

FIG. 20 illustrates the incorporation of a reclosable closure strip into a more common HFF machine configuration, with the longitudinal fin seal 302 formed on the bottom side of the rectangular film tube 300. As in FIG. 19, closure strip 100 is folded about the outside of the extended film edge flanges, which are separated by an insulating rail (not shown) that extends through the nip between the fin sealing rollers 308.

Similarly, the closure strip described above may be provided in form-filled packaging, such as that currently employed to package cookies and candy bars, as a releasable closure. In such cases, the closure strip may be located at one sealed end of the package, opposite another sealed end, or along a longitudinal seam of the package. By "bag", we mean to include such packages.

A number of embodiments of the invention have been described. Nevertheless, it will be understood that various modifications may be made without departing from the spirit and scope of the invention. For example, one closure strip can have only a band of loop-engageable hooks, while the other closure strip has only a band of hook-engageable loops. In some embodiments, both closure strips have both hook and loop bands. In some cases, both closure strips have only hooks, the hooks of one closure strip capable of engaging hooks of the other closure strip. In some embodiments, closure strips have hooks that include stems and heads that extend in one or more discrete directions from the stems (e.g., J hooks, palm tree hooks, etc.). In some embodiments, closure strips have hooks that include stems and heads that extend outwardly in multiple directions (e.g., mushroom-shaped hooks, flat top hooks, etc.). Accordingly, other embodiments are within the scope of the following claims.

What is claimed is:

1. A method of packaging a food product for retail sale, the method comprising:
forming a bag of sheet material; and
inserting a food product into the bag;
wherein the bag comprises a ventilated, reclosable closure arranged to secure the bag against loss of bag contents, the closure comprising first and second bands of fastener elements placed to form the ventilated, reclosable closure along an opening of the bag allowing an amount of air into and out of the bag with the bag in a closed position after the bag has been opened at the opening to access the food product, the first band of fastener elements comprising an array of male fastener elements with stems extending from a base and heads arranged to engage a field of fibers.

2. The method of claim 1 including attaching a tamper-evident seal extending across the opening, the seal configured to be blemished upon opening the bag.

3. The method of claim 1 further comprising:
permanently affixing the reclosable closure to two side walls of a bag body along the opening, the reclosable closure configured to form an air-tight seal prior to opening the bag to access the food product, the closure comprising
a sheet-form substrate with the array of male fastener elements extending therefrom; and
a band of loops formed by the fibers carried on the substrate arranged to engage the male fastener elements;
wherein the substrate defines a frangible region extending along the closure between the bands of loop and male fastener elements for tearing the substrate between the band of male fastener elements and loops to form separate male fastener element and loop closure strips and to break the air-tight seal.

4. The method of claim 1, wherein the array of male fastener elements have stem portions that are integrally molded with the base.

5. The method of claim 4, wherein the hooks have mushroom-shaped head portions that extend laterally from the stems in multiple directions.

6. The method of claim 4, wherein the hooks have head portions that extend laterally from the stems in one or more discrete directions.

7. The method of claim 1 wherein the step of forming the bag includes
providing a continuous length of sheet material and directing the continuous length of sheet material over a forming head; and
attaching the closure to the sheet material along its continuous length.

8. The method of claim 7 further including severing one bag length of the sheet material to form the bag having the closure along the opening of the bag prior to inserting the food product.

9. The method of claim 7 further including severing one length of the bag film to form the bag having the releasable closure along the opening of the bag subsequent to inserting the food product.

10. The method of claim 1, wherein the sheet material comprises a food-contact grade material.

11. The method of claim 1, wherein the food product comprises produce.

12. The method of claim 1, wherein the food product comprises a granular material.

13. A prepackaged food product comprising:
a quantity of food product contained within a bag comprising
a bag body having two opposing side walls joined along three edges to form therebetween a pouch having an open end;
a first fastening region having a base and an array of fastener elements with stems extending from the base, the first fastening region permanently attached to one of the two opposing side walls; and
a second fastening region having a base and an array of fastener-engageable loops extending from the base, the second fastening region permanently attached to the other of the two opposing side walls,
wherein the first and second regions are placed to form a releasable closure along an opening of the bag for securing the opening in a closed position after the bag has been opened to access the food product;
the first and second regions defining therebetween an air vent after the bag has been opened between the food product and atmosphere with the bag in the closed position.

14. The prepackaged food product of claim 13 comprising a closure strip carrying the first and second fastening regions permanently attached to the two side walls of the bag body forming an air-tight seal prior to opening the bag, the closure strip comprising a sheet-form resin substrate forming the base;
wherein the substrate defines at least one frangible region extending longitudinally along the length of the closure strip between the region of loops and the region of fastener elements for tearing the substrate between the loops and the fastener elements to form separate fastener element and loop closure strips and to break the air-tight seal.

15. The prepackaged food product of claim 13, wherein the fastener element stems are integrally molded with the base.

16. The prepackaged food product of claim 13, wherein the fastener elements include mushroom-shaped heads that extend laterally from the stems in multiple directions.

17. The prepackaged food product of claim 13, wherein the fastener elements include heads that extend laterally from the stems in one or more discrete directions.

18. The prepackaged food product of claim 13, wherein the bag body comprises a food-contact grade material.

19. The prepackaged food product of claim 13, wherein the food product comprises produce.

20. The prepackaged food product of claim 13, wherein the food product comprises a granular material.

21. A method of providing access to a food product, the method comprising:
providing the reclosable bag of claim 3 having the food product positioned within the bag;
transporting the food product, the food product being isolated from the environment by the air-tight seal;
breaking the air-tight seal and forming separate fastener element and loop closure strips;
opening the reclosable bag to gain access to the food product positioned within the bag; and
engaging the fastener element closure strip and the loop closure strip, the fastener element and loop closure strips forming the ventilated, reclosable closure between the food product and environment with the fastener elements and the loops engaged.

* * * * *

UNITED STATES PATENT AND TRADEMARK OFFICE
CERTIFICATE OF CORRECTION

PATENT NO. : 7,163,706 B2  Page 1 of 1
APPLICATION NO. : 10/688720
DATED : January 16, 2007
INVENTOR(S) : William H. Shepard It is certified that error appears in the above-identified patent and that said Letters Patent is hereby corrected as shown below:

Claim 21, column 16, line 53:
   delete "claim 3" and replace with --claim 13--.

Signed and Sealed this

Twenty-fourth Day of February, 2009

JOHN DOLL
*Acting Director of the United States Patent and Trademark Office*